UNITED STATES PATENT OFFICE.

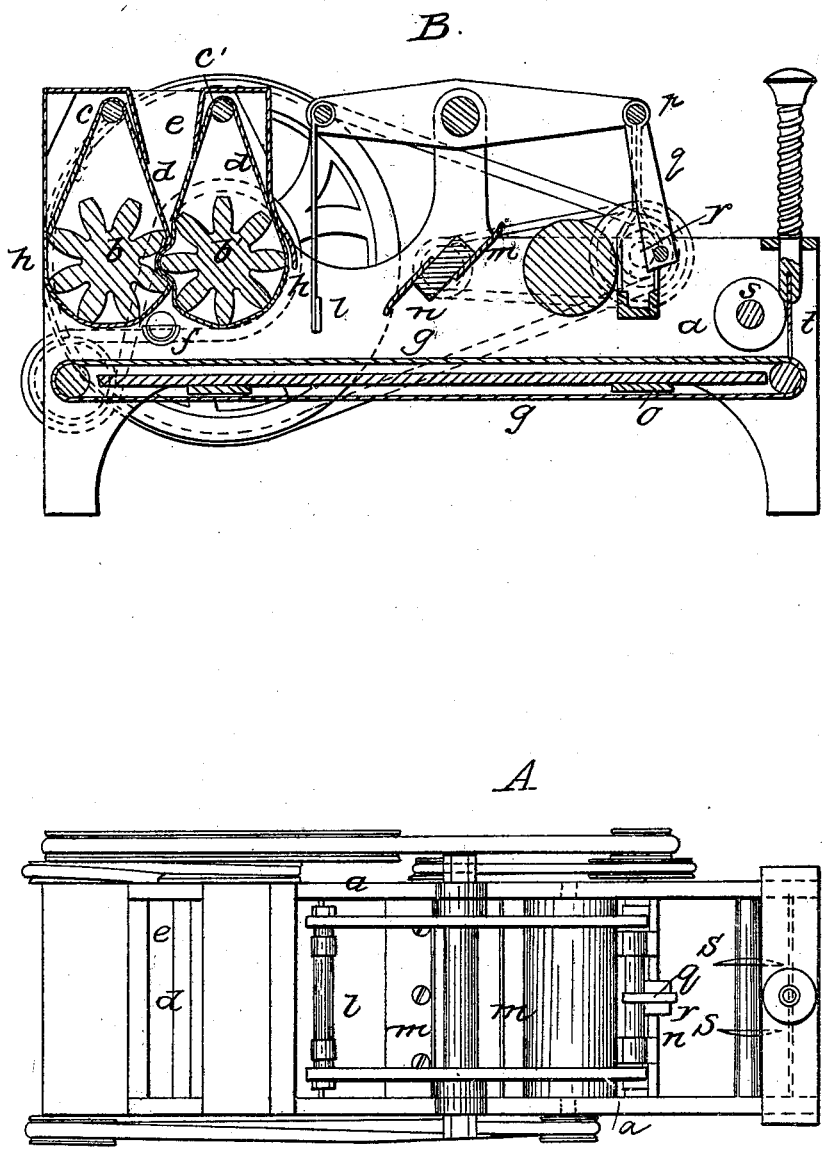

DARIUS WELLINGTON, OF BOSTON, MASSACHUSETTS, ASSIGNOR TO CORNELIUS WELLINGTON.

IMPROVED PEAT-MACHINE.

Specification forming part of Letters Patent No. 53,065, dated March 6, 1866.

*To all whom it may concern:*

Be it known that I, DARIUS WELLINGTON, of Boston, in the county of Suffolk and State of Massachusetts, have invented an Improved Machine for Preparing Peat for Fuel; and I do hereby declare that the following, taken in connection with the drawings which accompany and form part of this specification, is a description of my invention sufficient to enable those skilled in the art to practice it.

The invention relates to the construction or arrangement of mechanism for treating crude peat to prepare it for fuel; and it consists, primarily, in the employment of two expressing-rolls provided with teeth which mesh together and with aprons traveling around and with them, the peat from the bog being fed through a hopper or conductor between these aprons and being pressed by the action of the teeth of the wheels; also, in the employment, in combination with these wheels and aprons, of an endless belt for removing the peat and conveying it to the action of cutting and compressing mechanism; also, in the employment, in connection with the expressing-rolls, of mechanism for dividing and compressing the peat as it travels along with the apron, so that when discharged it shall be in the form of condensed cakes or blocks.

In the preparation of peat for fuel the chief obstacles to overcome are to free the peat from the water held in suspension by it and to reduce its bulk so as to render it compact and portable. The common method of treating the substance, as is well known, is to cut it with spades into rectangular blocks and stack it for the gradual evaporation of the water; but this process is not sufficiently practical for the preparation of the peat for other than very limited consumption in the immediate vicinity of the bog, as the drying is effected very slowly, and the peat is left in too bulky a condition for a merchantable fuel.

It is very difficult to effect the separation of the peat and water by pressure, because when in a semi-fluid condition the fine particles of peat and the water are so intimately combined that the fluid and water escape together, leaving only the coarse, fibrous, and less valuable matter in the press. I find that by using toothed or corrugated rolls covered with fibrous aprons and meshing together compression between the teeth will cause the water to be forced out, leaving the peat between the aprons.

The drawings represent a plan at A and a vertical longitudinal section at B of a mechanism embodying the invention.

$a$ denotes a frame-work; $b\ b'$, two rotary corrugated expressing-rolls mounted therein, meshing together and driven by any suitable power. Around each of these rolls and a small pulley, $c$ or $c'$, an apron, $d$, passes, as seen at B, each apron extending the length of the roll and being made of such length (in the direction of its movement) as to permit the two aprons to be pressed up together between the teeth of the rolls as they mesh together. The rolls are surmounted by a hopper or conductor, $e$, leading down between the aprons and conducting the peat thrown into it down between and to the action of the rolls. As the peat is caught between the aprons in their approach together, and as the teeth operate upon the aprons, driving them alternately between the teeth of the respective rolls, the water is expelled through the fibers of the aprons and falls into a cross-spout, $f$, by which it is led away and discharged at the side of the machine, the closeness of the fibers preventing the escape of the peat with the water. Each apron straightens across the adjacent teeth of the rolls as they pass out of connection, and the pressed peat falls from the machine or upon a long conveyer or apron, $g$, any peat which adheres to the surface of the apron being removed therefrom by scrapers $h$. This apron $g$ passes around pulleys $i$ and receives motion from a belt, $k$, connecting with a pulley on the main shaft, or in any other suitable manner. As the peat travels along with the conveyer or apron $g$ it is brought under the action of a vertically-moving knife, $l$, and of rotary knives or beaters $m$, receiving their respective motions, as will be readily understood from the drawings. After passing under the action of this mechanism, by which it is brought into a finely-divided condition, a reciprocating plunger or compressor, $n$, is brought down upon it and compresses it against the surface of the apron, which is carried by the descent of the plunger down upon a bed-piece, $o$, the plunger being connected to a beam-shaft, $p$, which is driven up and down by a link, $q$, connecting such shaft to a crank-shaft, $r$, driven by a belt from the main shaft. This brings the material into the form of a flat mass, which, as it progresses, is brought under the action of disk-knives $s$, which divide or partially divide it in the direction of its length, and under a cross-knife, $t$, by descent of which it may be subdivided into rectangular blocks, which, by the successive action of the expressing-rolls, the cutting mechanism, the compressing mechanism, and the dividing mechanism, are brought into the form of compact blocks of portable and merchantable form, having the whole or a large proportion of the moisture expressed from them, so that either immediately or with a slight exposure they are in merchantable condition, and in a proper state to be used advantageously as a fuel.

I claim—

1. The employment of the toothed or corrugated expressing-rolls having fibrous aprons extending around them, and operating together substantially as set forth.

2. In combination with the rolls, operating as set forth, the conveyer $g$, for carrying the compressed peat from the rolls to the successive action of the cutting, compressing, and dividing mechanism, substantially as set forth.

3. In combination with the compressing-rolls and the conveyer, operating as set forth, the cutting mechanism, the compressing mechanism, and the dividing mechanism, operating separately or together, in connection with the expressing-rolls, substantially as set forth.

In witness whereof I have hereunto set my hand this 18th day of January, A. D. 1866.

DARIUS WELLINGTON.

Witnesses:
FRANCIS GOULD,
J. B. CROSBY.